US006718192B1

United States Patent
Samara et al.

(10) Patent No.: US 6,718,192 B1
(45) Date of Patent: Apr. 6, 2004

(54) METHOD AND APPARATUS FOR REAL-TIME 3D IMAGE RENDERING ON A PICTURE ARCHIVAL AND COMMUNICATIONS SYSTEM (PACS) WORKSTATION

(75) Inventors: Yaseen Samara, Arlington Heights, IL (US); William M. Stoval, Mt. Prospect, IL (US); Neil D. D'Souza, Mt. Prospect, IL (US); Greg J. Angst, Delafield, WI (US); David W. Kurzynski, Vernon Hills, IL (US); Jerome Knoplioch, Neuilly sur Seine (FR); Frank J. Owen, Elmhurst, IL (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/449,712

(22) Filed: Nov. 24, 1999

(51) Int. Cl.$^7$ ................................................ A61B 5/05
(52) U.S. Cl. .................. 600/407; 382/128; 382/131; 128/920; 128/922
(58) Field of Search .................. 600/407, 408, 600/410, 411, 425, 427, 436, 437; 345/660–665; 128/916, 920, 923, 922, 925, 924; 382/128, 131, 132, 154, 284, 285; 705/1–4; 707/1–10, 102; 709/213–221, 223, 227, 236, 312; 340/286.07; 700/108; 367/7, 11; 73/620–630

(56) References Cited

U.S. PATENT DOCUMENTS

| 4,833,625 | A | * | 5/1989 | Fisher et al. ................ 345/536 |
| 4,835,688 | A | | 5/1989 | Kimura |
| 5,226,113 | A | | 7/1993 | Cline et al. |
| 5,235,510 | A | * | 8/1993 | Yamada et al. .............. 128/922 |
| 5,359,512 | A | * | 10/1994 | Nishihara .................... 382/128 |
| 5,454,371 | A | * | 10/1995 | Fenster et al. ............... 128/916 |
| 5,537,127 | A | | 7/1996 | Jingu |
| 5,586,262 | A | * | 12/1996 | Komatsu et al. ............... 705/2 |
| 5,668,846 | A | | 9/1997 | Fox et al. |
| 5,675,744 | A | | 10/1997 | Tsujii |
| 5,715,823 | A | | 2/1998 | Wood et al. |
| 5,734,915 | A | | 3/1998 | Roewer |
| 5,740,267 | A | * | 4/1998 | Echerer et al. ............. 382/132 |
| 5,779,634 | A | | 7/1998 | Ema et al. |
| 5,787,889 | A | * | 8/1998 | Edwards et al. ............ 128/916 |
| 5,806,521 | A | * | 9/1998 | Morimoto et al. .......... 600/447 |
| 5,812,691 | A | * | 9/1998 | Udupa et al. ............... 382/128 |
| 5,835,618 | A | | 11/1998 | Fang et al. |
| 5,835,735 | A | | 11/1998 | Mason et al. |
| 5,839,440 | A | * | 11/1998 | Liou et al. .................. 600/431 |

(List continued on next page.)

OTHER PUBLICATIONS

Siemens, Clinical Networking—copies of web pages found at http://www.med.siemens.com as of Oct. 20, 1999.
R. Ohbuchi and H. Fuchs, Incremental Volume Rendering Algorithm and Interactive 3D Ultrasound Imaging, Lecture Notes in Computer Science, 1991, V511, pp. 486–500.*
Hosono et al., Three Dimensional Display of Cardiac Structures Using Reconstructed Magnetic Resonance Imaging, Journal of Digital Imaging, vol. 8, No. 3 (Aug.), 1995; pp. 105–115.*

*Primary Examiner*—Eleni Mantis Mercader
(74) *Attorney, Agent, or Firm*—Foley & Lardner; Peter J. Vogel; Michael A. Della Penna

(57) ABSTRACT

An image management system (10), such as a PACS system is disclosed. The PACS system includes a PACS server (20) coupled to a communications network (22) and a plurality of PACS workstations (40) also coupled to a communications network (22). Each PACS workstation (40) is configured to receive two dimensional image information and provide incremental volume rendering on the PACS workstation (40) while the two dimensional image information is being received.

20 Claims, 1 Drawing Sheet

U.S. PATENT DOCUMENTS

| | | | | |
|---|---|---|---|---|
| 5,877,819 A | * | 3/1999 | Branson | 348/620 |
| 5,915,242 A | | 6/1999 | Tsujii | |
| 5,930,327 A | | 7/1999 | Lin | |
| 5,959,678 A | | 9/1999 | Callahan et al. | |
| 5,961,454 A | * | 10/1999 | Kooy et al. | 600/407 |
| 6,159,150 A | * | 12/2000 | Yale et al. | 600/437 |
| 6,193,660 B1 | * | 2/2001 | Jackson et al. | 600/443 |
| 6,210,327 B1 | * | 4/2001 | Brackett et al. | 600/407 |
| 6,226,418 B1 | * | 5/2001 | Miller et al. | 382/294 |
| 6,260,021 B1 | * | 7/2001 | Wong et al. | 705/1 |
| 6,280,387 B1 | * | 8/2001 | Deforge et al. | 128/916 |
| 6,322,505 B1 | * | 11/2001 | Hossack et al. | 600/437 |
| 6,363,163 B1 | * | 3/2002 | Xu et al. | 382/130 |
| 6,366,800 B1 | * | 4/2002 | Vining et al. | 128/920 |
| 6,370,413 B1 | * | 4/2002 | Alvarez et al. | 128/916 |
| 6,377,162 B1 | * | 4/2002 | Delestienne et al. | 340/286.07 |
| 6,398,731 B1 | * | 6/2002 | Mumm et al. | 600/437 |
| 6,424,730 B1 | * | 7/2002 | Wang et al. | 382/128 |
| 6,440,071 B1 | | 8/2002 | Slayton et al. | |
| 6,511,426 B1 | | 1/2003 | Hossack et al. | |
| 6,526,304 B1 | * | 2/2003 | Patel et al. | 600/407 |
| 6,529,757 B1 | * | 3/2003 | Patel et al. | 600/407 |
| 6,549,214 B1 | * | 4/2003 | Patel et al. | 345/660 |

* cited by examiner

METHOD AND APPARATUS FOR REAL-TIME 3D IMAGE RENDERING ON A PICTURE ARCHIVAL AND COMMUNICATIONS SYSTEM (PACS) WORKSTATION

This invention relates to image management systems, and more particularly to image reconstruction on an image workstation coupled to an image manager.

BACKGROUND OF THE INVENTION

Medical scanners and medical imaging machines are an integral part of modern medical practice. These scanners and medical imaging devices utilize both electromagnetic radiation and sonic wave to produce images which are viewed by doctors for the diagnosis and care of patients. For example, ultrasound machines are useful for viewing fetuses during prenatal care in a pregnancy or blood flow patterns in arteries. Magnetic resonance imaging (MRI) machines are useful for producing images of a wide range of soft tissues.

In a large hospital, medical scanners and medical imaging devices are preferably networked with a central image management system, such as a picture archival and communications system (PACS). The PACS is designed to provide a central storage for archive for medical images. Further, PACS is configured so that stored images may be retrieved. Typically, a hospital will have a single PACS that is networked with a plurality of medical scanners and medical imaging devices located throughout the hospital. Further, the PACS will be networked with a plurality of image workstations, such as a PACS workstation. Images generated by medical scanners and medical imaging devices are transferred to the PACS for storage and later retrieval and review by doctors located throughout the hospital at any of the plurality of image workstations.

Conventionally, doctors or users of image workstations (e.g., PACS workstations) were able to view only two dimensional image renderings of the images retrieved from the PACS. Three dimensional image rendering was restricted to three dimensional rendering on stand alone workstations dedicated for three dimensional graphics processing. Further, because of the restriction to stand alone workstations, conventional three dimensional graphics processing was not carried out on PACS workstation therefore image information and data could not be simply received from the PACS server. Further, because the 3D processing is conventionally carried out on stand alone workstations, the PACS has not been used to store 3D image information.

Therefore, there is a need for an image workstation that is in communication with the PACS and is configured to carry out 3D processing thereon. Further, there is a need for an image workstation that is capable of receiving image information from the PACS and constructing a 3D image rendering while the information is being retrieved.

SUMMARY OF THE INVENTION

An embodiment of the invention relates to an image management system. The image management system includes an image manager having a plurality of inputs and outputs. The inputs are configured to receive image information signals and the outputs are configured to provide image output signals. The image manager is configured to store information representative of a plurality of two dimensional image slices. The output signals are representative of the stored two dimensional image slices. The image management system also includes an imaging device having an output coupled to at least one of the inputs of the image manager, and configured to provide an image signal. The image management system further includes an image workstation having an input coupled to at least one of the outputs of the image manager. The image workstation is configured to receive output signals from the image manager representative of selected two dimensional image slices stored by the image manager. The image workstation is configured to construct three dimensional image renderings while the output signals are being received by the image workstation.

Another embodiment of the invention relates to a method of producing a rendering of a three dimensional object from a plurality of two dimensional image information files. The method includes receiving, by an image manager, a plurality of two dimensional image information files from an imaging device. The method also includes storing a plurality of two dimensional image files on the image manager and communicating selected two dimensional image information files to an image workstation. The method further includes receiving a two dimensional image information file by the image workstation and building a portion of the rendering of the three dimensional object based on the two dimensional information file and any other two dimensional information files previously received by the image workstation.

Still another embodiment of the invention relates to a medical imaging system. The medical imaging system includes a medical scanner. The medical imaging system also includes an image manager coupled to the medical scanner and configured to receive and store signals representative of two dimensional image slices from the medical scanner. The medical imaging system also includes an image workstation configured to receive selected signals representative of two dimensional image slices and is configured to construct a three dimensional rendering from the signals representative of the two dimensional image slices substantially while the two dimensional image slices are being received. A partial rendering of the three dimensional rendering may be manipulated while the image workstation is receiving the two dimensional image slices.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
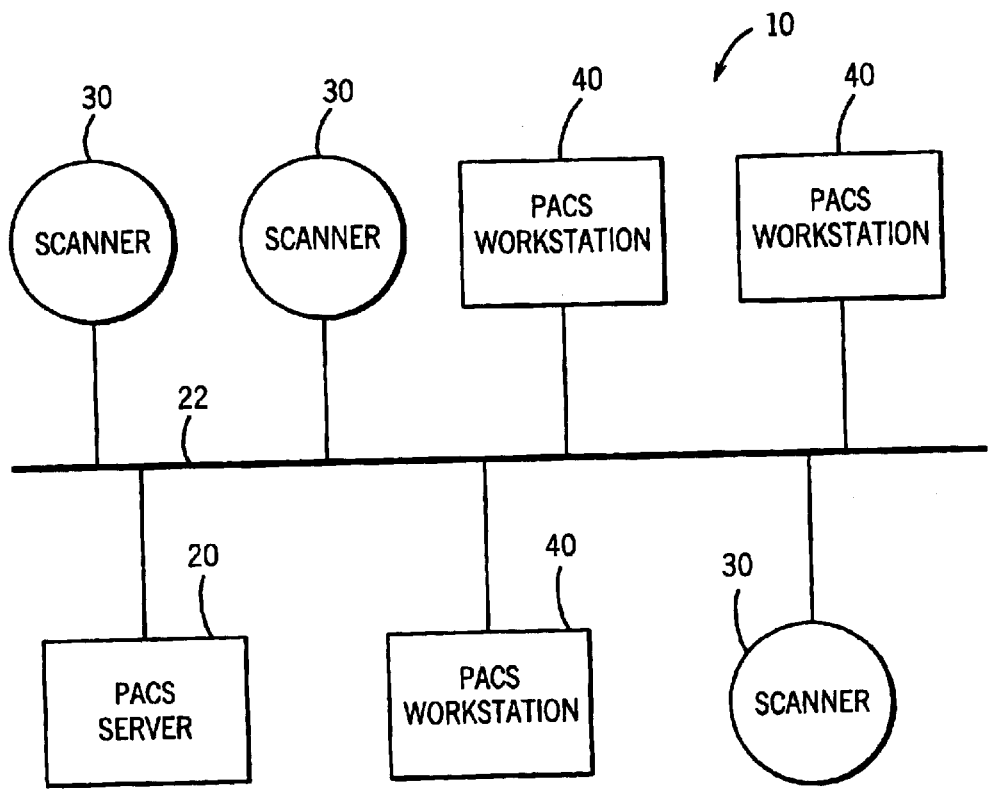
FIG. 1 is a block diagram of an image handling system.

Referring now to FIG. 1, a block diagram of an image handling system 10 is depicted. Image handling system 10 includes an image manager 20 which, in a preferred embodiment, is a picture archival and communication system (PACS) server, however image manager 20 is not limited to a PACS server, but may be any picture archiving apparatus. In a preferred embodiment, image manager 20 includes an information storage unit (ISU) for short-term storage and retrieval and an archival storage unit (e.g., an optical disc storage and optical disc reader system) for long-term storage and retrieval.

Image manager 20 is coupled to a plurality of imaging devices 30 which are configured to create digitized image information based on an image subject such as, but not limited to, portions of the human anatomy. In a preferred embodiment, imaging devices 30 include, but are not limited to magnetic resonance imaging (MRI) devices, ultrasound imaging devices, computed tomography (CT) devices, nuclear imaging devices, X-ray imaging devices and any other types of imaging devices, not limited to the medical field. In a preferred embodiment, imaging devices 30 produce image files in the DICOM3 or DEFF formats however, other image file formats are equally applicable. The image files are communicated from imaging devices 30 to image manager 20 as two dimensional slices or image information representative of two dimensional slices through the object being imaged. Therefore, from a single image file stored on image manager 20, a two dimensional image rendering may be reconstructed. Such two dimensional renderings are often presented to a user on any of a number of workstations 40 that are coupled to communications network 22 (such as an ethernet or other applicable communications network connection) that is in communication with image manager 20. Workstation 40 may be, in a preferred embodiment, a PACS workstation.

Figure 2:
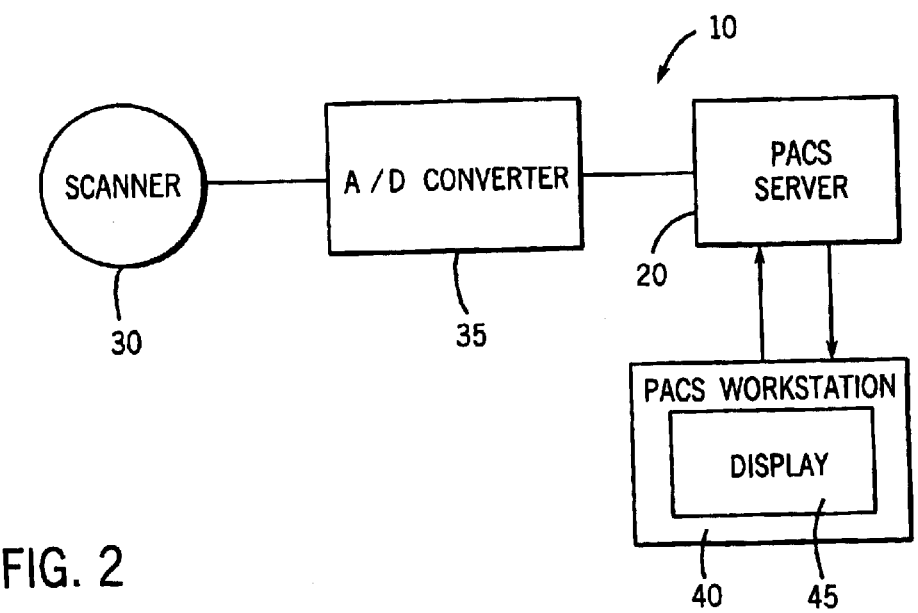
FIG. 2 is a block diagram of data flow from a scanning or imaging device to an imaging workstation.

In a preferred embodiment, it is preferable to have the option of viewing the imaged object in a three dimensional rendering on workstation 40 instead of a two dimensional rendering. Three dimensional renderings may be accomplished by a number of pertinent algorithms including surface rendering algorithms, maximum intensity projections (MIP) and other applicable three dimensional rendering processes. Referring now to FIG. 2, a block diagram, showing a portion of system 10, depicts the flow of information in system 10. In operation, scanner 30 scans an object, such as a patient. Scanner 30 generates an electrical signal representative of the configuration of the object. The analog signal is communicated to a digital analog converter 35. Digital analog converter 35 produces a digital signal that is communicated to PACS server or image manager 20. In an alternative embodiment, scanner 30 may directly generate a digital signal, thus digital to analog converter 35 would not be required. Further, alternatively scanner 30 may include the digital analog converter 35 therein. Image manager 20 stores the image signals in a file format such as DICOM3 or DEFF. The image files may be stored on any of a variety of storage devices, such as magnetic storage devices or optical storage devices. Image information from image manager 20 may be selectively retrieved by any of a number of workstations or other information retrieval devices coupled to communications network 22. Workstation 40 includes a display device 45.

To display a three dimensional image on display 45, workstation 40 must retrieve a plurality of two dimensional image files from image manager 20. Often, however because of the delay required in retrieving a plurality of two dimensional image slices or two dimensional image files, manipulation of a three dimensional image on workstation 40 is delayed until all of the two dimensional image slices are retrieved. However, in a preferred embodiment, workstation 40 includes programmed logic or software that allows display 45 to show a three dimensional image rendering that is being built or compiled substantially while the two dimensional image slices are being retrieved (such as incremental volume rendering). Therefore, a three dimensional image rendering is built based on the two dimensional image file being retrieved and any two dimensional image files that have already been retrieved by image workstation 40.

Therefore, a user utilizing workstation 40 may manipulate the image and view the image before it is completed. Therefore, for example if a physician is looking at an MRI scan of a human head, and the scan was done from the top of the head to the bottom, the physician who is interested in an area near the forehead does not have to wait until all of the two dimensional image slices, to the bottom of the head, near the neck of the patient have been received. The physician may manipulate (rotate, scale, colorize, measure, etc.) and view a partial three dimensional rendering while the two dimensional image slices are being communicated to the image manager.

While the preferred embodiment refers to imaging devices used in the medical area, the reference to imaging devices may be interpreted broadly. The embodiment can encompass those situations in which any imaging device is coupled to and in communication with a communications network and an image manager.

Further, those who have skill in the art will recognize that the present invention is applicable with many different hardware configurations, software architectures, communications protocols and organizations or processes.

While the detailed drawings, specific examples, and particular formulations given describe preferred embodiments, they serve the purpose of illustration only. The materials and configurations shown and described may differ depending on the chosen performance characteristics and physical characteristics of the communications networks. For example, the type of communications network or communications protocols used may differ. The systems shown and described are not limited to the precise details and conditions disclosed. Furthermore, other substitutions, modifications, changes, and omissions may be made in the design, operating conditions, and arrangements of the preferred embodiments without departing from the spirit of the invention as expressed in the appended claims.

What is claim is:

1. An image management system comprising:
    a picture archival and communications system (PACS) server having a plurality of inputs and outputs, the inputs configured to receive image information signals and the outputs configured to provide image output signals, the PACS server configured to store information representative of a plurality of two dimensional image slices, and the output signals representative of the stored two dimensional image slices;
    at least two imaging devices having outputs coupled to at least one of the inputs of the PACS server, and configured to provide an image signal; and
    a PACS workstation having an input coupled to at least one of the outputs of the PACS server, and configured to receive output signals from the PACS server representative of selected two dimensional image slices stored by the PACS server, the PACS workstation configured to construct three dimensional image renderings while the output signals are being received by the PACS workstation.

2. The image management system of claim 1 wherein the three dimensional image renderings comprise a partial three dimensional rendering which is configured to be manipulated while the output signals are being received by the PACS workstation.

3. The image management system of claim 1 wherein the imaging device includes a computed tomography (CT) device.

4. The image management system of claim 3 wherein the imaging device includes a magnetic resonance (MR) device.

5. The image management system of claim 1 wherein the imaging device is a medical imaging device.

6. The image management system of claim 1 wherein the PACS workstation includes a display.

7. The image management system of claim 6 wherein the PACS workstation is configured to provide the partial three dimensional rendering on the display while the two dimensional image slices are being received.

8. The image management system of claim 7 wherein the display of the partial three dimensional rendering is configured to be manipulated with respect to the display.

9. A method of producing a rendering of a three dimensional object from a plurality of two dimensional image information files, comprising iteratively:

receiving, by a picture archival and communications system (PACS) server, a plurality of two dimensional image information files from at least one of a plurality of imaging devices;

storing the plurality of two dimensional image information files on the PACS server;

communicating a selected two dimensional image information file to a PACS workstation;

receiving the selected two dimensional image information file by the PACS workstation; and building a portion of the rendering of the three dimensional object based on the selected two dimensional information file and two dimensional information files previously received by the PACS workstation while the selected two dimensional image information on files are being received by the PACS workstation.

10. The method of claim 9 wherein at least one of the imaging devices is a magnetic resonance (MR) device.

11. The method of claim 9 wherein at least one of the imaging devices is a computed tomography (CT) device.

12. The method of claim 9 wherein receiving the plurality of two dimensional image information files from at least one of the plurality of imaging devices further comprises receiving two dimensional image information files from medical imaging devices.

13. The method of claim 9 wherein the communicating step is carried out over an ethernet connection.

14. A medical imaging system, comprising:

at least one medical scanner;

a picture archival and communications system (PACS) server coupled to the medical scanner and configured to receive and store signals representative of two dimensional image slices from the medical scanner;

at least two PACS workstations configured to receive selected signals representative of two dimensional image slices and configured to construct a three dimensional rendering from the signals representative of the two dimensional image slices substantially while the two dimensional image slices are being received, wherein the three dimensional image renderings comprise a partial three dimensional rendering which is configured to be manipulated while at least one of the PACS workstations is receiving two dimensional image slices.

15. The medical imaging system of claim 14 wherein at least one of the medical scanners is an ultrasound imaging device.

16. The medical imaging system of claim 14 wherein at least one of the medical scanners is a magnetic resonance imaging (MRI) device.

17. The medical imaging system of claim 14 wherein at least one of the medical scanners is a computed tomography (CT) imaging device.

18. The medical imaging system of claim 14 wherein the PACS workstation includes a display.

19. The medical imaging system of claim 18 wherein the PACS workstation is configured to provide the partial three dimensional rendering on the display while the two dimensional image slices are being received.

20. The medical imaging system of claim 19 wherein the partial three dimensional rendering is configured to be manipulated with respect to the display.

* * * * *